J. O. SMITH.
APPARATUS FOR DRYING AND SEASONING LUMBER.
No. 10,393. Reissued Oct. 16, 1883.
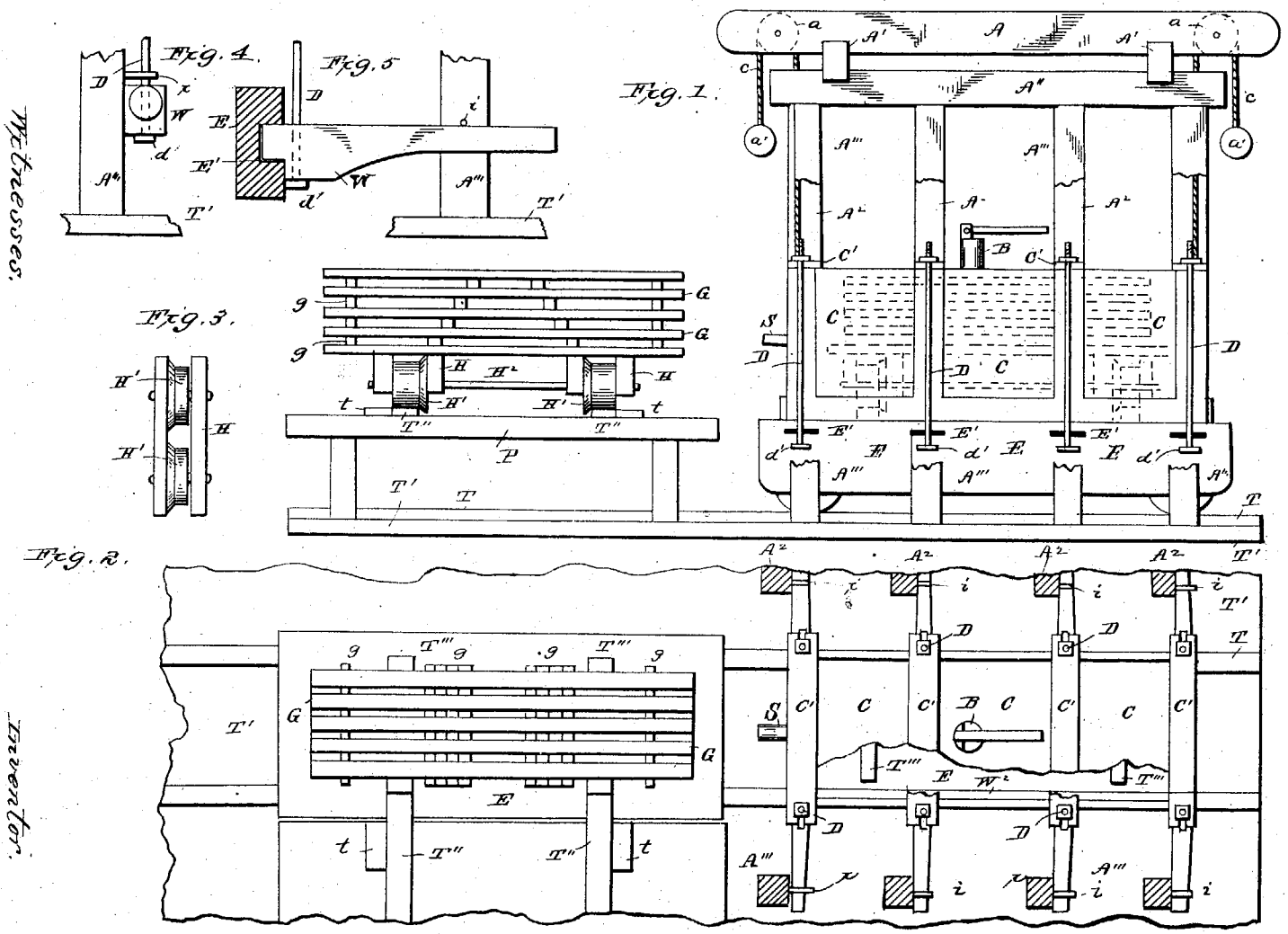
Witnesses.
Edwin L. Jewell.
A. H. Simmons
Inventor.
John O. Smith
By Martin Toulmin
Attorney
N. PETERS, Photo-Lithographer, Washington, D. C.

UNITED STATES PATENT OFFICE.

JOHN OWEN SMITH, OF JAMISON, ALABAMA.

APPARATUS FOR DRYING AND SEASONING LUMBER.

SPECIFICATION forming part of Reissued Letters Patent No. 10,393, dated October 16, 1883.

Original No. 270,138, dated January 2, 1883. Application for reissue filed May 17, 1883.

*To all whom it may concern:*

Be it known that I, JOHN OWEN SMITH, a citizen of the United States, residing at Jamison, in the county of Chilton and State of Alabama, have invented certain new and useful Improvements in Apparatus for Drying and Seasoning Lumber, of which the following is a specification, reference being had therein to the accompanying drawings.

This invention relates to improvements in apparatus for drying and seasoning lumber, and has for its object the extraction of the sap from the wood before drying and seasoning. The apparatus consists, essentially, of a frame formed of vertical, longitudinal, and transverse beams adapted to suspend a movable hood, and a car provided with transverse tracks adapted to support a truck loaded with lumber, and to carry the same under the hood. This object is accomplished by the processes and machinery illustrated in the accompany-drawings, forming a part of this specification, in which—

Figure 1 is a side elevation with some of the parts broken away. Fig. 2 is a plan view, partly in section. Fig. 3 is a detailed view of one of the trucks. Fig. 4 is an elevation of a part of one of the vertical posts A‴. It shows the pin *i* and an end view of the lever W, and a part of one of the rods D. Fig. 5 is an elevation of one of the vertical posts A‴ broken off, an end view of pin *i*, a side view of lever W, rod D, and a section of the rail of the car E with its slot E′.

A is a part of the frame, consisting of a suitable number of longitudinal timbers arranged to suspend the hood C by ropes or chains *c* passing over pulleys *a*, the ends of which are attached to the hood C, and to the counter-balance-weights *a*′.

A′ are cross-beams, which serve to support the beams A, and also to bind the two longitunal beams A″ together.

$A^2$ and A‴ are upright beams, which support the longitudinal beams A″. They are provided with pins *i*, the object of which is hereinafter described.

C is a hood, which may be constructed of any suitable material. I prefer to make it of wood and line it with sheet metal. On top it is provided with cross-timbers C′, the ends of which project beyond the sides of the hood C, and are slotted to receive the rods D.

B is a safety-valve placed on top of the hood C.

S is a cock for the introduction of steam into the interior of the hood C, and is intended to be connected to a steam-boiler with suitable pipes.

D are vertical rods provided with nuts and threaded for purposes of adjustment. The lower ends of the rods D are furnished with heads *d*, which form a bearing for the slotted levers W.

E is a car, which travels upon the rails T. On top it is covered with sheet metal, and has also transverse tracks or rails T‴, which support the wheels of the truck H.

T′ is a platform, or it may form part of the ground itself, upon which the frame A‴ $A^2$ is built and the track T is laid.

P is a platform or raised surface for the support of the rails T″, which carry the trucks H while being loaded with the lumber G.

H are trucks, which may be constructed with a long shaft, H″, as shown in Fig. 1, or in separate sets, as shown in Fig. 3.

E′ are slots in the frame of the car E, for the introduction of the slotted ends of the levers W.

The track T may be made of any convenient length, and any number of platforms P may be employed and located along the line of the track T.

In using this device the hood C is raised and remains suspended by the chains *c* and weights *a*′. The car E is then removed until its transverse tracks T‴ are opposite the rails T″ on the platform P. The truck H is then pushed until it reaches a central position on the tracks T‴ of the car E. The car E is then placed under the hood C, which is then lowered upon the car, and the rods D are brought down by means of the levers W in such manner as to make a tight joint by means of packing $W^2$ of suitable description, placed between the lower edges of the hood C and the top of the car E. The steam-pipes are then connected with the cock S, and steam is admitted into the interior of the hood, any surplus pressure being allowed to escape by means of the safety-valve B. When the lumber has been subjected to the action of the steam a sufficient length of time—usually about two and a half hours—to dissolve and extract the sap therefrom, the hood C is raised and the car E is moved to any convenient locality, and the lumber G is stacked for drying and seasoning, the time for which is greatly accelerated by the process of steaming hereinbefore described.

I would here observe that I have recently ascertained, by actual experiments on a large scale, that the lumber, after having been subjected to the several steps of my process, is rendered of a much higher marketable value and much more lasting and durable. The reason of this result is that I thoroughly expel all the decaying matter contained in the wood, and thereby arrest its decomposition and prolong its soundness and utility, and effectually and positively prevent "bluing" or mildewing, which enhances the value of the lumber to above twenty-five per cent.

The pins *i* in the upright frames A''' $A^2$ are for the purpose of holding the levers W down, and keep the hood C and the car E in close contact during the process of steaming. I prefer to pile the lumber on the truck H with the slats *g* arranged as shown in Fig. 1, as in this manner it can be removed in a body and allowed to remain without further handling until sufficiently dry for the planing-machine or other purposes.

It will be observed that the tracks T'' may convey the car H from any desired part of the lumber-yard to the position shown in Fig. 1 of the drawings, whence it is run upon the tracks T'' of the car E, whereby the truck H and its load are conveyed beneath the hood. After the lumber or load has there been subjected to the process hereinbefore described, the car E is run out opposite the platform P and the car H run upon its tracks T'' to any convenient place in the yard, and the load removed therefrom. By this arrangement it will be observed that the truck which conveys the lumber from the yard is adapted to be carried into the hood and returned to the yard without unloading or reloading, which saves the repeated handling of the lumber and reduces the cost and number of men otherwise necessary to be employed.

Having described my invention, what I desire to secure by Letters Patent and to claim, is—

1. The combination of the hood C and the car E, provided with means to secure a tight joint between the two, as described, and for the purposes set forth.

2. The combination of the hood C, beams A, with the pulleys *a*, chains *c*, and counterweights *a'* with truck E, having slots E', rods D, and levers W, substantially as described, and for the purposes set forth.

3. The combination, in a lumber-drying machine, of the hood C, having safety-valve B, cock S, and binding-rods D with car E, as shown and described, and for the purposes set forth.

4. In an apparatus for drying and seasoning lumber, the combination, with the frame of such apparatus, of a hood adapted to inclose a load of lumber, substantially as described.

5. In an apparatus for drying and seasoning lumber, the combination, with the frame of such apparatus, of a movable hood or compartment supported by said frame, and a movable support for the lumber, said hood being adapted to inclose a load of lumber and to fit down upon said support, substantially as described.

6. In an apparatus for drying and seasoning lumber, the combination, with the frame of such apparatus, of a vertically-movable hood or compartment, a movable support for the lumber, means for connecting the hood or compartment with said frame and for adjusting it up and down from and upon said support to uncover and cover a load of lumber, substantially as described.

7. In an apparatus for drying and seasoning lumber, the combination, with the frame thereof, of a vertically-movable hood or compartment, means for adjusting up and down to uncover and cover a load of lumber, and a suitable packing to secure a tight joint between the hood and the lumber support, substantially as described.

8. In an apparatus for drying and seasoning lumber, the combination, with the frame thereof, a movable hood or compartment, means for adjusting it up and down, of a car or truck adapted to convey the load and support the same within the hood, and means to secure a tight joint between the said truck and hood, substantially as described.

9. In an apparatus for drying and seasoning lumber, the combination, with the frame thereof, a movable hood or compartment, and means for adjusting it vertically, of a car provided with tracks, a second car or truck adapted to be conveyed beneath the hood by the first-mentioned car, substantially as described.

10. In an apparatus for drying and seasoning lumber, the combination, with the frame thereof, a vertically-movable hood or compartment, and means for adjusting it up and down, of two systems of tracks, the one leading under the movable hood, and the other from the yard, a car provided with tracks, and a second car or truck adapted to rest thereupon, and to be conveyed thereby beneath the hood, and means to secure a tight joint between the hood and second truck, whereby the lumber is conveyed from the yard to the hood and back again without unloading and reloading, substantially as described.

JOHN O. SMITH.

Witnesses:
H. A. TONHEIM,
C. A. NEALE.